US012521398B2

(12) United States Patent
Park et al.

(10) Patent No.: US 12,521,398 B2
(45) Date of Patent: Jan. 13, 2026

(54) COMPOSITION FOR TREATING SYNUCLEINOPATHIES

(71) Applicants: STANDIGM INC., Seoul (KR); AJOU UNIVERSITY INDUSTRY-ACADEMIC COOPERATION FOUNDATION, Suwon-si (KR)

(72) Inventors: Sang Myun Park, Suwon-si (KR); Yu Ree Choi, Suwon-si (KR); Jae Bong Kim, Suwon-si (KR); Soo Jin Park, Suwon-si (KR); Min Young So, Seoul (KR); Hee Jung Koo, Seoul (KR); Jin Han Kim, Seoul (KR); Sang Ok Song, Seoul (KR); So Jeong Yun, Seoul (KR); Soo Jeong Kim, Seoul (KR)

(73) Assignees: STANDIGM INC., Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 766 days.

(21) Appl. No.: 17/757,707

(22) PCT Filed: Dec. 16, 2020

(86) PCT No.: PCT/KR2020/018492
§ 371 (c)(1),
(2) Date: Jun. 17, 2022

(87) PCT Pub. No.: WO2021/125811
PCT Pub. Date: Jun. 24, 2021

(65) Prior Publication Data
US 2023/0017675 A1     Jan. 19, 2023

(30) Foreign Application Priority Data
Dec. 19, 2019  (KR) ........................ 10-2019-0171249

(51) Int. Cl.
*A61K 31/536* (2006.01)
*A61K 9/00* (2006.01)
*A61P 25/16* (2006.01)

(52) U.S. Cl.
CPC .......... *A61K 31/536* (2013.01); *A61K 9/0019* (2013.01); *A61K 9/0053* (2013.01); *A61P 25/16* (2018.01)

(58) Field of Classification Search
CPC .. A61K 31/536; A61K 9/0019; A61K 9/0053; A61P 25/16

USPC ........................................................ 514/230.5
See application file for complete search history.

(56) References Cited

U.S. PATENT DOCUMENTS 5,519,021 A     5/1996   Young et al.

FOREIGN PATENT DOCUMENTS

| EP | 2 965 760 A1 | 1/2016 |
| KR | 10-1639864 B1 | 7/2016 |
| KR | 10-2017-0010302 A | 1/2017 |
| KR | 10-1838802 B1 | 3/2018 |
| WO | WO 2018/204765 A1 | 11/2018 |

OTHER PUBLICATIONS

Petrov et al., Neurotheraputics, 2019, 16, 635-648 (Year: 2019).*
Dehner et al., "Parkinsonism in HIV infected patients during antiretroviral therapy—data from a Brazilian tertiary hospital", The Brazilian Journal of Infectious Diseases, 20(5), 2016, pp. 499-501.
Eggers et al., "HIV-1-associated neurocognitive disorder: epidemiology, pathogenesis, diagnosis, and treatment", J Neurol (2017) 264:1715-1727.
Jellinger et al., "Are dementia with Lewy bodies and Parkinson's disease dementia the same disease?", BMC Medicine (2018) 16:34.
Rumbaugh et al., "HIV-associated neurocognitive disorders", Neurology: Clinical Practice, Jun. 2015, pp. 224-231.
Tisch et al., "Parkinsonism in HIV-infected patients on Highly Active Antiretroviral Therapy", Neurology 73, Aug. 4, 2009, pp. 401-403.
International Search Report mailed Apr. 7, 2021 in International Application No. PCT/KR2020/018492.
Mast, Natalia, et al. "Pharmacologic stimulation of cytochrome P450 46A1 and cerebral cholesterol turnover in mice." Journal of Biological Chemistry 289.6 (2014): 3529-3538.
Zambon, Federico, et al. "Cellular a-synuclein pathology is associated with bioenergetic dysfunction in Parkinson's iPSC-derived dopamine neurons." Human Molecular Genetics 28.12 (2019): 2001-2013.

* cited by examiner

*Primary Examiner* — Yevgeny Valenrod
(74) *Attorney, Agent, or Firm* — Knobbe, Martens, Olson & Bear, LLP

(57) ABSTRACT

A composition for preventing or treating synucleinopathies, which includes efavirenz or a salt or solvate thereof and a pharmaceutically acceptable carrier, is provided. The composition is useful in preventing or treating synucleinopathies, such as Parkinson's disease, dementia with Lewy bodies, and multiple system atrophy, because the composition serves to hinder cell-to-cell transmission of alpha-synuclein, prevent intracellular aggregation of α-synuclein, and inhibit transmission of aggregated α-synuclein.

10 Claims, 10 Drawing Sheets

AP: +1.0 ML: -1.8 DV: -3.2 (mm)
From Bregma

COMPOSITION FOR TREATING SYNUCLEINOPATHIES

CROSS-REFERENCE TO RELATED APPLICATION

This application claims priority to and the benefit of Korean Patent Application No. 2019-0171249, filed Dec. 19, 2019, the disclosure of which is incorporated herein by reference in its entirety.

BACKGROUND

Field of the Invention

The present invention relates to a composition for treating synucleinopathies, comprising efavirenz, and more particularly, to a composition for treating synucleinopathies, such as Parkinson's disease, dementia with Lewy bodies, multiple system atrophy, and the like, by hindering cell-to-cell transmission of α-synuclein, preventing intracellular aggregation of alpha-synuclein, and inhibiting transmission of aggregated alpha-synuclein.

Discussion of Related Art

Efavirenz, that is, (4S)-6-chloro-(cyclopropylethynyl)-1,4-dihydro-4-(trifluoromethyl)-2H-3,1-benzoxazin-2-one, is an antiretroviral drug that is useful in suppressing a human immunodeficiency virus (HIV), preventing or treating infections caused by the HIV, and treating acquired immune deficiency syndrome (AIDS). As a drug including efavirenz in the form of a tablet, a Sustiva® tablet is a therapeutic agent for treating HIV-1 infection and has been approved by the U.S. Food and Drug Administration (F.D.A.) and sold on the market.

Korean Patent No. 1639864 discloses that substances that have been used for other purposes, such as efavirenz, chlorhexidine, thioguanosine, mebendazole, and the like, are useful in treating Alzheimer-type dementia by reducing an expression level of a BACE1 protein that produces an amyloid beta (Aβ) protein. However, the present invention is directed to a therapeutic effect of efavirenz in treatment of Parkinson's disease by reducing the transmission of alpha-synuclein and inhibiting aggregation of alpha-synuclein, and thus has a completely different action mechanism and medical use from Korean Patent No. 1639864.

International Patent Publication No. WO2018/204765 discloses that a wide range of compounds having Formula I: ~(LXXXV) are effective in treating epilepsy and its related brain diseases by inhibiting the activity of potassium channels, reducing a potassium ion flux, enhancing dopaminergic neuronal excitability, and the like. However, in the present invention, efavirenz has a therapeutic effect on Parkinson's disease by reducing the transmission of alpha-synuclein and inhibiting the aggregation of alpha-synuclein. The therapeutic effect on Parkinson's disease in the present invention has no known association with inhibition of the potassium channel activity, reduction of the potassium ion flux, and enhancement of dopaminergic neuronal excitability as disclosed in International Patent Publication No. WO2018/204765.

Also, European Patent Publication No. 02965760 discloses that the antiretroviral drugs such as tenofovir, lamivudine, efavirenz, and the like are effective in treating chronic inflammatory diseases such as erythrodermic psoriasis, but the chronic inflammatory disorders disclosed in European Patent Publication No. 02965760 and Parkinson's disease described in the present invention have been recognized to be disorders that have a completely different action mechanism and are distinctly distinguished from each other. Therefore, there is no evidence indicating that efavirenz is useful in treating synucleinopathies such as Parkinson's disease, and the like by inhibiting the transmission of alpha-synuclein, based on contents of the above patent documents.

Meanwhile, alpha-synuclein (α-synuclein) is a key protein of a Lewy body in the cytoplasm found in patients with Parkinson's disease and is known to be mainly distributed at a presynaptic terminal of a neuron and expressed at a high level in throughout brain tissue. The α-synuclein is a naturally unfolded protein that is present mainly in the cytosol and plays a key role in synaptic transmission and synaptic plasticity by increasing the release of transmitters from the presynaptic terminal. It is known that α-synuclein is a pathogenic factor that causes other degenerative diseases such as dementia with Lewy bodies, multiple system atrophy, and the like as well as Parkinson's disease. All the diseases associated with abnormal deposition of α-synuclein are generally referred to as synucleinopathies. Research on α-synuclein as a common therapeutic target for the diseases has been actively conducted. As a part of this research, the present inventors have confirmed that the activation of SHP-1/-2 (Src homology region 2 domain-containing phosphatase-1/-2) participates in transmission of α-synuclein, and the activation of SHP-1/-2 is mediated by an α-synuclein receptor FCγRIIB (IgG Fc receptor II-B; FcgammaRIIB), and found that a preparation capable of inhibiting the expression or activity of SHP-1/-2 is useful in preventing or treating degenerative brain diseases such as Parkinson's disease, dementia with Lewy bodies, and multiple system atrophy (Korean Patent No. 1838802). As a representative synucleinopathy, Parkinson's disease is one of the representative neurodegenerative diseases that occur at an old age. It is known to develop in approximately 1% of people aged 65 and older and has an increasing incidence with age. Parkinson's disease has representative symptoms of movement disorders such as resting tremors, rigidity, bradykinesia, postural instability, and the like. Also, Parkinson's disease is characterized by microgliosis, astrogliosis, progressive degeneration of dopaminergic neurons, the presence of Lewy bodies in the dopaminergic neurons, accumulation of alpha-synuclein (α-synuclein) in the substantia nigra pars compacta, and the like.

Although the exact cause of Parkinson's disease is still unknown, it is presumed that Parkinson's disease is associated with environmental factors by neurotoxins such as pesticides, and the like, genetic factors, mitochondrial dysfunction, oxidative stress, the dysfunction in removing intracellular proteins, and the like. The genetic factors are known to be caused by various genetic mutations of α-synuclein, Parkin, PINK-1, DJ-1, LRRK2, and the like.

In recent years, there are a number of drugs that relieve the symptoms of Parkinson's disease, but there are no drugs reported to prevent the progression of the disease. Also, the chronic use of the drugs increases the risk of causing debilitating side effects.

The drugs used to treat Parkinson's disease are known to include an L-dopa preparation, dopamine receptor agonists, anticholinergic drugs, monoamine oxidase inhibitors (MAOI), and the like. However, because most of these drugs serve not to causatively treat symptoms but to control symptoms, continuous intake of the drugs is required. Long-term administration of these drugs causes problems such as adverse drug effects. For example, anticholinergic drugs may exhibit autonomic nervous system dysfunction, mental dysfunction, or the like, so that there is limitation on their continuous administration to elderly patients. Also, the L-dopa preparation has drawbacks in that its effect is gradually degraded, and it causes side effects such as abnormal movements (e.g., body contortion, involuntary movements of hand and feet) when it is administered for a long period of time.

As such, although the Parkinson's disease has a high incidence, its exact pathogenic factors are still unknown. Therefore, because therapeutic methods for improving the symptoms have been used instead of the fundamental cure, there is an urgent need for development of more effective therapeutic agents.

Accordingly, the present inventors have conducted research to screen for therapeutic agents effective for synucleinopathies including Parkinson's disease, and found that efavirenz selected through artificial intelligence (AI) deep-learning technology hinders cell-to-cell transmission of α-synuclein, prevents intracellular aggregation of α-synuclein, and inhibits transmission of aggregated α-synuclein. Therefore, the present invention has been completed based on these facts.

SUMMARY OF THE INVENTION

The present invention is directed to providing a composition for preventing or treating synucleinopathies selected from Parkinson's disease, dementia with Lewy bodies, and multiple system atrophy, which comprises efavirenz.

One aspect of the present invention provides a composition for preventing or treating synucleinopathies, which comprises efavirenz or a salt or solvate thereof and a pharmaceutically acceptable carrier.

In the context of the present invention, the term "efavirenz" is understood to encompass the compound itself as well as pharmaceutically acceptable salts or solvates thereof.

Efavirenz according to the present invention is a non-nucleoside reverse transcriptase inhibitor having the chemical name of (4S)-6-chloro-(cyclopropylethynyl)-1,4-dihydro-4-(trifluoromethyl)-2H-3,1-benzoxazin-2-one and is a drug belonging to the benzoxazinone family, and its synthesis and use are disclosed in a number of documents. The efavirenz of the present invention may be prepared by methods known in the art, for example, a method disclosed in U.S. Pat. No. 5,519,021.

The salt of efavirenz according to the present invention includes a pharmaceutically acceptable, and relatively non-toxic inorganic or organic acid addition salt, and may, for example, comprise acetates, nitrates, tartrates, hydrochlorides, sulfates, phosphates, methanesulfonates, camphor sulfonates, oxalates, maleates, succinates, or citrates.

Also, the efavirenz of the present invention includes a solvate in which a solvent suitable for therapeutic administration is incorporated into a crystal lattice, and a preferred example of the solvent is ethanol or water. When the solvent is water, the solvate is referred to as a hydrate. In general, the solvate is formed by dissolving a compound in a suitable solvent. In this case, such a solvate is isolated using an anti-solvent or isolated by cooling. The solvate is typically dried under an atmospheric air condition, or formed into an azeotropic mixture. The typical solvate includes a hydrate such as a monohydrate, a dihydrate, a trihydrate, or the like.

In the present invention, the term "synucleinopathies" generally refers to disorders associated with abnormal deposition of α-synuclein, and, for example, comprises Parkinson's disease, dementia with Lewy bodies, multiple system atrophy, or other rare disorders also having α-synuclein pathologies, such as various neuroaxonal dystrophies, but the present invention is not limited thereto.

As used herein, the term "treatment" includes curing, alleviation, prophylaxis, prevention, delay, or reduction of the causes of synucleinopathies, or symptoms caused by the causes of synucleinopathies. Meanwhile, as used herein, the term "prevention" refers to all types of actions that suppress or delay the causes of synucleinopathies, or the symptoms caused by the causes of synucleinopathies. Specifically, the treatment or prevention of synucleinopathies according to the present invention includes curing, alleviation, prophylaxis, prevention, delay, or reduction of any symptoms of the synucleinopathies by hindering cell-to-cell transmission of α-synuclein, preventing intracellular aggregation of α-synuclein, and/or inhibiting transmission of aggregated α-synuclein.

According to one aspect of the present invention, a composition for preventing or treating Parkinson's disease, which comprises efavirenz or a salt or solvate thereof and a pharmaceutically acceptable carrier, is provided.

In the present invention, the term "Parkinson's disease" refers to a neurodegenerative disorder that causes movement disorders and non-movement disorders. Here, the movement disorders include tremors, hypokinesia (for example, bradykinesia, akinesia, or rigidity), postural instability, an abnormal gait, or dysphagia. The non-movement disorders include autonomous and neuropsychiatric disorders, for example, anosmia or insomnia. In the context of the present invention, the "Parkinson's disease" includes any of the symptoms, but the present invention is not limited thereto.

In a pathological aspect, the term "Parkinson's disease" is characterized by Lewy bodies and/or Lewy neurites appearing in various brain regions as the disease progresses and the loss of dopamine nerves in the substantia nigra pars compacta.

Since it was found in the late 1990s that the Lewy bodies are mainly composed of a protein also referred to as 'α-synuclein' and missense mutations in α-synuclein causes Parkinson's disease, α-synuclein has come in the spotlight as a main target for treatment of Parkinson's disease. There is extensive research on agents for preventing and treating Parkinson's disease by hindering transmission of α-synuclein, preventing aggregation of alpha-synuclein, and inhibiting transmission of pathogenic α-synuclein. For example, immunotherapies for targeting α-synuclein, therapeutic agents for hindering aggregation of α-synuclein or pulverizing aggregates, antisense oligonucleotides for lowering a level of α-synuclein, and the like have been researched as the agents for preventing and treating Parkinson's disease. A base sequence of α-synuclein gene may be obtained from known databases such as GenBank of NCBI, and the like. By way of example, the α-synuclein gene may be a gene represented by GenBank Accession NP_001139526.1.

A pharmaceutical composition of the present invention may be provided in various forms and doses by conventional techniques as disclosed in, for example, Remington: The Science and Practice of Pharmacy, $21^{th}$ Ed. For example, the pharmaceutical composition of the present invention may be formulated into forms such as a tablet, a capsule, a lozenge, a troche, hard candy, a powder, a spray, a cream, an ointment, a jelly, a gel, a paste, a lotion, an ointment, an aqueous suspension, an injectable solution, a syrup, and the like by combining efavirenz or a salt or solvate thereof with various pharmaceutically acceptable inert carriers, but the present invention is not limited thereto. The pharmaceutically acceptable carrier of the present invention includes solid diluents or fillers, sterile aqueous media, and various nontoxic organic solvents. In general, the efavirenz or salt or solvate thereof may be included at a content of approximately 5.0% by weight to approximately 70% by weight in the formulation.

The pharmaceutical composition of the present invention may be formulated for an appropriate route of administration, for example, may be formulated for oral, intravenous, intraarterial, intramuscular, or intracutaneous administration. Preferably, the pharmaceutical composition of the present invention may be formulated for oral administration. The pharmaceutical composition of the present invention may be administered according to the methods known in the art. In particular, oral administration is preferred. The dose may vary depending on the type and severity of a disease, the patient's condition, and the like. In general, a dose of efavirenz is administered in a range of 1 to 2000 mg/day, preferably in a range of 1 to 1,000 mg/day, more preferably in a range of 10 to 1,000 mg/day, a range of 50 to 1,000 mg/day, a range of 100 to 1,000 mg/day, a range of 200 to 1,000 mg/day, a range of 300 to 1,000 mg/day, or a range of 400 to 1,000 mg/day, and particularly preferably in a range of 500 to 1,000 mg/day, a range of 500 to 900 mg/day, a range of 500 to 800 mg/day, or a range of 500 to 700 mg/day for an adult (weighing 60 kg), but the present invention is not limited thereto. The pharmaceutical composition of the present invention may be, for example, administered continuously once a day, twice a day, three times a day, four times a day for an extended period of time, for example, for weeks, months, years, or several decades, but the present invention is not limited thereto. The pharmaceutical composition according to the present invention may be co-administered with one or more additional drugs commonly used to treat synucleinopathies. Specifically, the co-administration includes administration of one composition including the efavirenz of the present invention or salt or solvate thereof and the one or more additional drugs, or administration thereof as separate preparations.

When the pharmaceutical composition according to the present invention is administered for treatment of Parkinson's disease, the pharmaceutical composition may be co-administered with one or more drugs commonly used for treatment or adjuvant treatment of Parkinson's disease, treatment or alleviation of symptoms of movement disorders, and the like. For example, the pharmaceutical composition for treating Parkinson's disease according to the present may be co-administered with a dopamine precursor (for example, levodopa, or melevodopa), a dopamine receptor agonist (for example, talipexole, piribedil, rotigotine, bromocriptine, pergolide, cabergoline, lisuride, pramipexole, ropinirole, or apomorphine), a dopamine-metabolic enzyme inhibitor (for example, a monoamine oxidase inhibitor, or a catechol-O-methyl transferase inhibitor), or an anticholinergic agent, but the present invention is not limited thereto.

According to the present invention, it is provided that a composition for preventing or treating synucleinopathies such as Parkinson's disease, dementia with Lewy bodies, and multiple system atrophy, comprising efavirenz or a salt or solvate thereof and a pharmaceutically acceptable carrier, based on that efavirenz hinders cell-to-cell transmission of alpha-synuclein, prevents intracellular aggregation of alpha-synuclein, and inhibits transmission of aggregated alpha-synuclein.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

In FIG. 4, Cg represents a cingulate cortex, M1 represents a primary motor cortex, M2 represents a secondary motor cortex, S1 represents a primary somatosensory cortex, S2 represents a secondary somatosensory cortex, Ins represents an insular cortex, Pir represents a piriform cortex, LS represents a lateral septum, Acb represents a nucleus accumbens, MS represents a medial septum, and Str represents a striatum;

In FIG. 6, Cortex represents a barrier of cortex, Str represents a striatum, and SN represents a substantia nigra. Also, Ipsilateral refers to an ipsilateral side with respect to a site in which the aggregated α-synuclein is injected, and Contralateral refers to a contralateral side with respect to the site in which the aggregated α-synuclein is injected.

DETAILED DESCRIPTION OF EXEMPLARY EMBODIMENTS

Hereinafter, the present invention will be described in detail with reference to exemplary embodiments thereof. However, it will be apparent to those skilled in the art that these exemplary embodiments are given by way of illustration of the present invention only, and are not intended to limit the scope of the present invention.

Example 1: Confirmation of Cytotoxicity

The present inventors selected efavirenz as a substance expected to have a therapeutic effect on α-synuclein-related disorders (Parkinson's disease) through a screening method using artificial intelligence (AI) deep-learning technology.

An SH-SY5Y cell line (ATCC) was used to confirm the cytotoxicity of efavirenz.

The SH-SY5Y cell line was seeded in a 96-well plate, cultured, treated with an increasing concentration (0, 5, 25 μM) of efavirenz, and then incubated at a constant temperature for 24 hours. Thereafter, cell viability was measured using an MTT test method. Cells treated with 0 μM efavirenz were used as the control. **$P<0.01$ against the control.

Figure 1A:
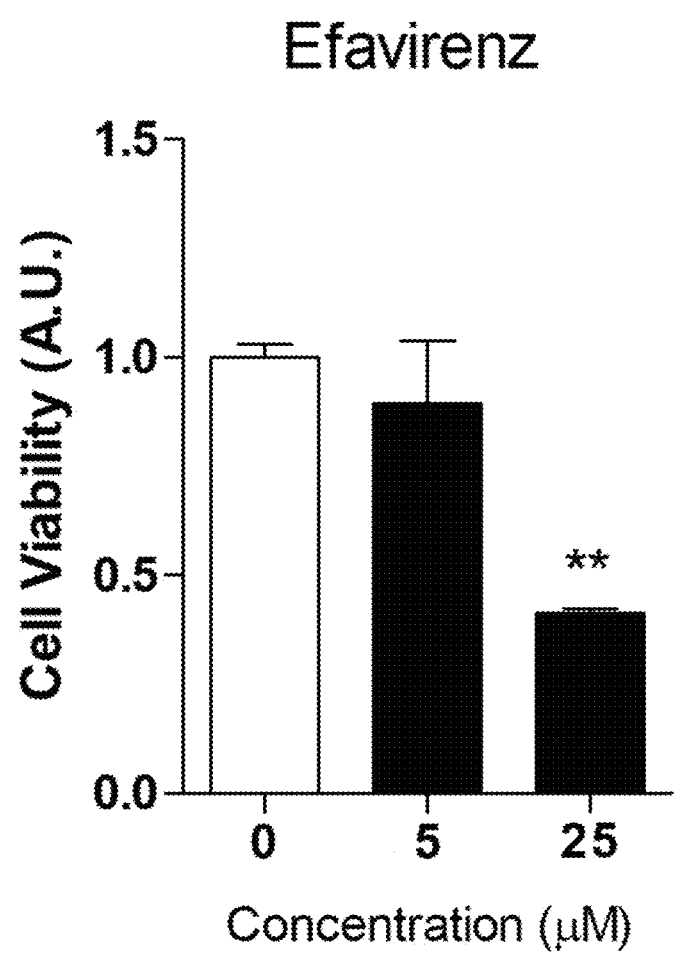
FIG. 1 shows the results of measuring cell viabilities according to the concentrations of efavirenz, chlorhexidine, naphazoline, and tenofovir.

As a result, cell viability was not changed significantly in the cells treated with 5 μM efavirenz, compared with the control, but a significant decrease in cell viability was observed in the cells treated with 25 μM efavirenz (FIG. 1A). Therefore, 5 μM efavirenz in which the cytotoxicity was not observed was used in subsequent experiments.

Also, in the next experiment, the cytotoxicities of chlorhexidine (N,N''''-1,6-hexanediylbis[N'-(4-chlorophenyl)(imidocarbon imidic diamide)]), naphazoline(2-(1-naphthylmethyl)-4,5-dihydro-1H-imidazole), and tenofovir (({[(2R)-1-(6-amino-9H-purin-9-yl)-2-propynyl]oxy}methyl) phosphonic acid) to be used as reference drugs were tested in the same manner as in the cytotoxicity experiment of efavirenz. Cells were treated with chlorhexidine at a concentration of 0, 10, 100 μM, treated with naphazoline at a concentration of 0, 100, 200 μM, and treated with tenofovir at a concentration of 0, 20, 30 μM, and cells treated with each control drug at a concentration of 0 μM was used as the control. *$P<0.05$, ***$P<0.001$ against the control.

Figure 1B:
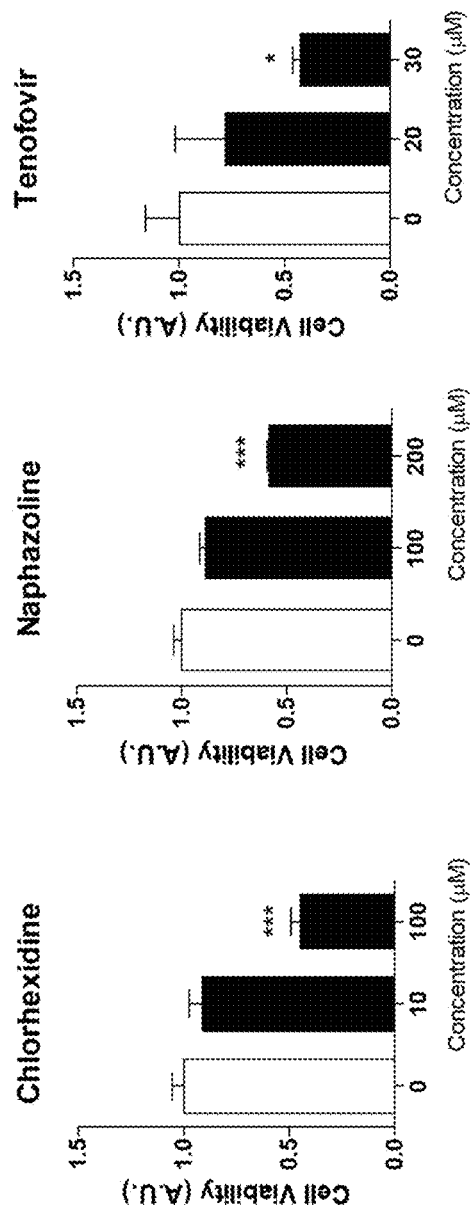

As a result, cell viability was not changed significantly in the cells treated with each of 10 μM chlorhexidine, 100 μM naphazoline, and 20 μM tenofovir, compared to the control, and a significant decrease in cell viability was observed in the cells treated with 100 μM chlorhexidine, 200 μM naphazoline, or 30 μM tenofovir (FIG. 1B). Based on these results, cell viability was tested using 10 μM chlorhexidine, 100 μM naphazoline, and 20 μM tenofovir in subsequent experiments.

Example 2: Confirmation of In Vitro Effect Of Efavirenz

To examine whether efavirenz has an inhibitory effect on the cell-to-cell transmission of α-synuclein and an effect of preventing the aggregation of α-synuclein, a dual chamber assay and a co-culture assay were performed.

2-1: Confirmation of Inhibitory Effect Of Efavirenz on Cell-to-Cell Transmission of α-Synuclein Using Dual Chamber Assay To test an inhibitory effect of efavirenz on the cell-to-cell transmission of α-synuclein, an experiment was performed using a dual chamber system in which an insert well was used as an apical chamber and a plate was used as basal chamber. A slide glass was included in the plate to stain the cells after the cell culture.

Figure 2A:
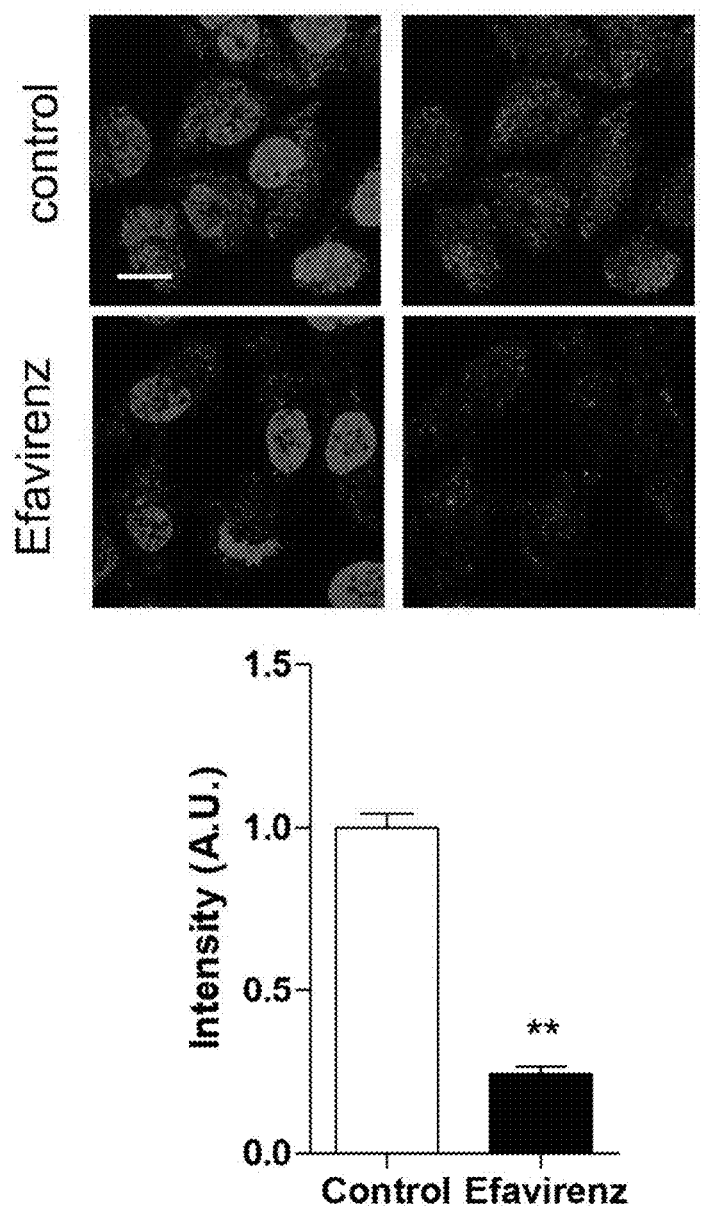
FIG. 2 shows the results of determining inhibitory effects of efavirenz, chlorhexidine, naphazoline, and tenofovir on the cell-to-cell transmission of α-synuclein.

In an insert well of the 12-well plate as the apical chamber, an SH-SY5Y cell line in which α-synuclein was over-expressed was seeded at a density of $4 \times 10^4$ cells/well, and in the 12-well plate as the basal chamber, an SH-SY5Y cell line in which α-synuclein was not over-expressed was seeded at a density of $4 \times 10^4$ cells/well and they were incubated at a constant temperature. The next day, the insert well was transferred to a place where the 12-well plate was placed to form a dual chamber. Thereafter, the chamber was treated with DMSO or 5 μM efavirenz and incubated at a constant temperature for 12 hours. The SH-SY5Y cells in the plate in which the chamber was treated with DMSO were used as the control. Then, the SH-SY5Y cells in the plate were subjected to immunostaining and observed using a confocal microscope. During the immunostaining, α-synuclein was stained red, and the nuclei were stained blue. Also, fluorescence intensities of α-synuclein in the control and the cells treated with efavirenz were compared. A scale bar represents 20 μm. $P<0.01$, *$P<0.001$ against the control. As shown in a fluorescence image of FIG. 2A, it was observed that the cell-to-cell transmission of α-synuclein was very active in the DMSO-treated control cells, but it was observed that the cell-to-cell transmission of α-synuclein was remarkably lowered in the cell treated with efavirenz, compared with the control. Also, when the fluorescence intensities of the immunostained α-synuclein were compared, the fluorescence intensity in the cells treated with efavirenz decreased by approximately 80%, compared with that of the control (FIG. 2A). Therefore, it was confirmed that efavirenz remarkably lowered the cell-to-cell transmission of α-synuclein.

*66 Meanwhile, to examine an inhibitory effect of chlorhexidine, naphazoline, or tenofovir on the cell-to-cell transmission of α-synuclein, cells were treated with each of 10 μM chlorhexidine, 100 μM naphazoline, and 20 μM tenofovir, and then tested in the same manner as in the dual chamber assay for efavirenz. In the case of the naphazoline-administered group, the cells treated with PBS were used as the control, and the cells treated with DMSO were used as the control in the case of the chlorhexidine- and tenofovir-administered groups. A scale bar represents 20 μm. $P<0.01$ and *$P<0.001$ against the control.

Figure 2B:
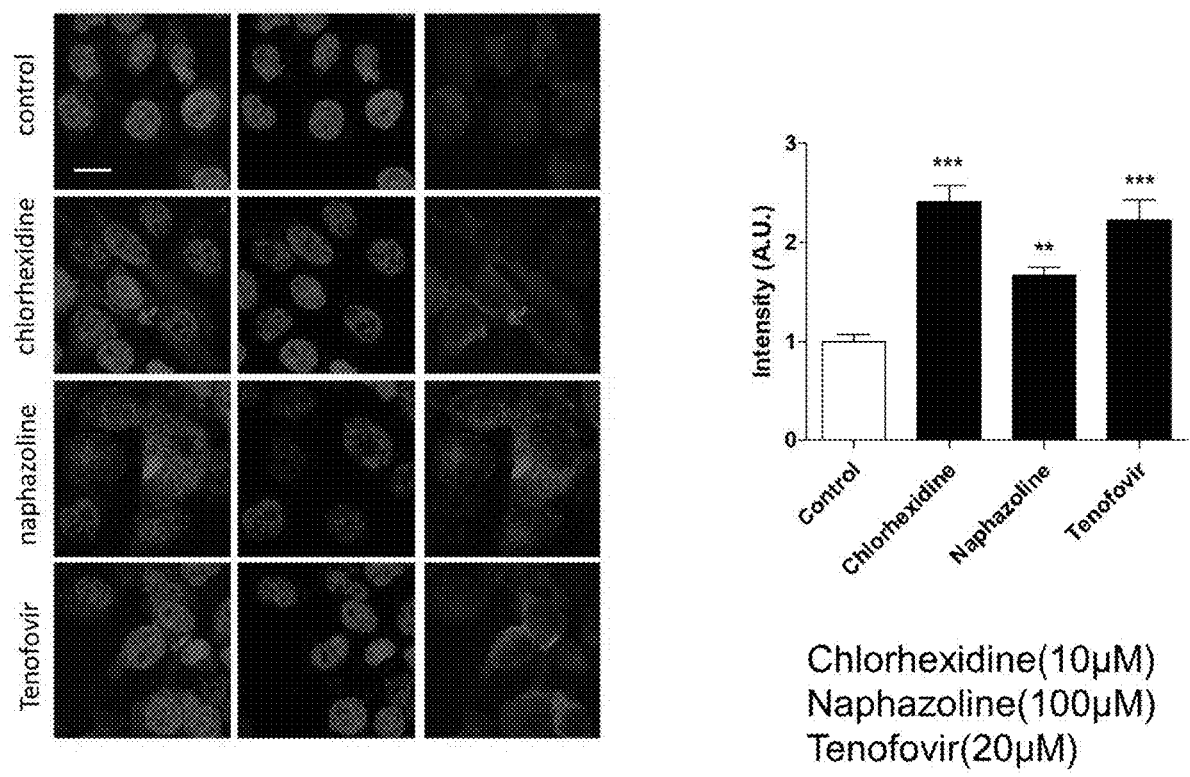

As shown in a fluorescence image of FIG. 2B, the cell-to-cell transmission of α-synuclein was observed in each of the control cells, and it was observed that the cell-to-cell transmission of α-synuclein rather remarkably increased in the cells treated with chlorhexidine, naphazoline, or tenofovir, compared with the control. Also, when the fluorescence intensities of the immunostained α-synuclein were compared, the fluorescence intensity in the cells treated with each of chlorhexidine, naphazoline, and tenofovir increased by approximately 90 to 150%, compared with the control (FIG. 2B).

Therefore, it was confirmed that chlorhexidine, naphazoline, and tenofovir rather increased the cell-to-cell transmission of α-synuclein.

2-2: Confirmation of Effect of Efavirenz on Prevention of Aggregation of α-Synuclein Using Co-Culture Assay A degeneration process of converting monomeric α-synuclein into aggregates may mainly cause Parkinson's disease. Therefore, it was tested whether efavirenz is involved in the propagation process of the over-expressed monomeric A53T α-synuclein to adjacent cells, which is converting the over-expressed monomeric α-synuclein into aggregates.

Figure 3A:
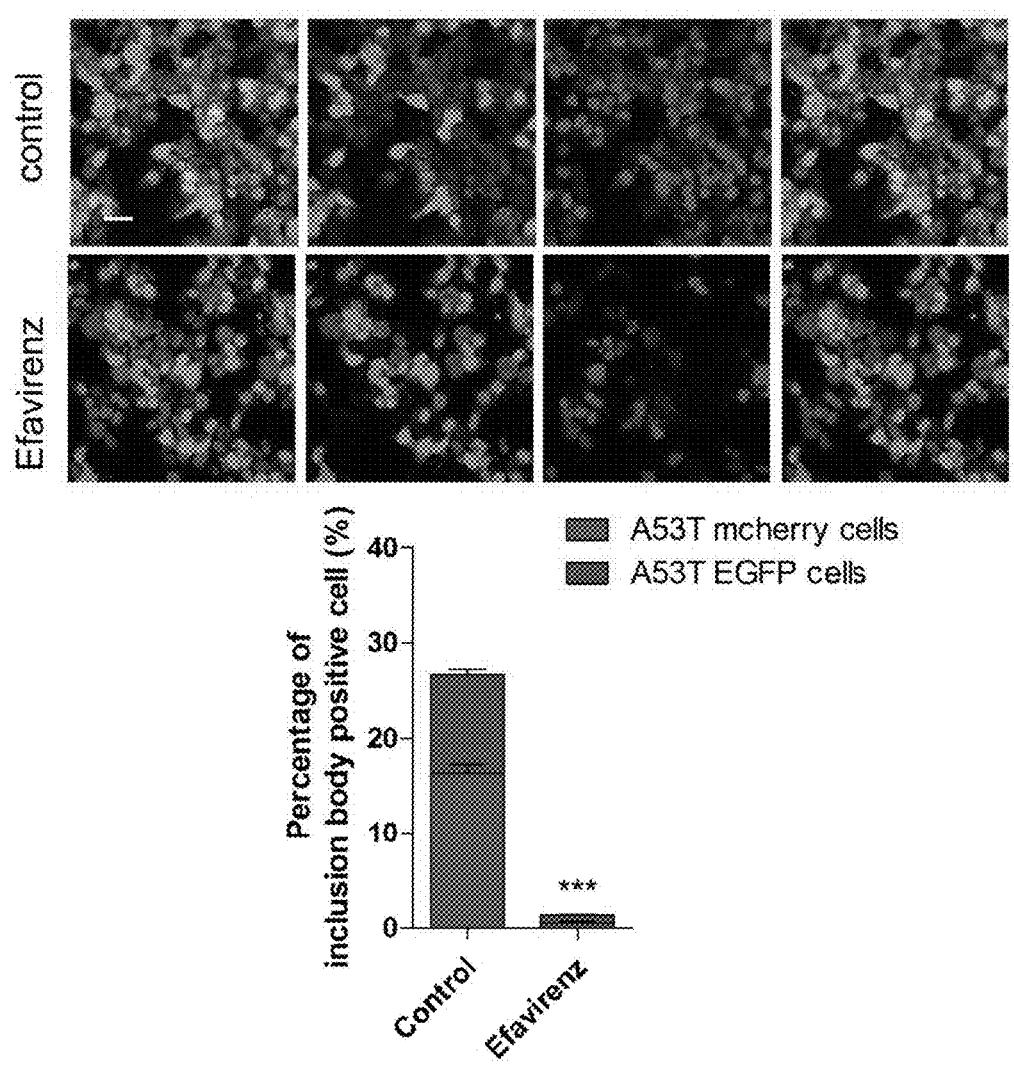
FIG. 3 shows the results of measuring a change in distribution of α-synuclein and a ratio of aggregated α-synuclein after treatment with efavirenz, chlorhexidine, naphazoline, and tenofovir.

For this purpose, an SH-SY5Y cell line (A53T EGFP cells) in which EGFP-labeled A53T α-synuclein was over-expressed and an SH-SY5Y cell line (A53T mcherry cells) in which mcherry-labeled A53T α-synuclein was over-expressed were prepared using a lentivirus. Thereafter, the A53T EGFP cells and the A53T mcherry cells were mixed to prepare co-cultured cells. Then, the co-cultured cells were treated with DMSO or 5 μM efavirenz, and co-cultured in the presence of 50 μM retinoic acid (RA) for 5 days. The co-cultured cells treated with DMSO were used as the control. At 5 days of the co-culturing, the aggregated α-synuclein (inclusion body-positive cells) was confirmed using a confocal microscope (the rightmost image of fluorescence images shown in FIG. 3A). Also, each of a combined distribution of EGFP and mcherry in the A53T EGFP cells and a combined distribution of mcherry and EGFP in the A53T mcherry cells was confirmed. FIG. 3A shows the results of measuring the fluorescence of EGFP, mcherry and DAPI, the results of measuring the fluorescence of EGFP, the results of measuring the fluorescence of mcherry, and the results of measuring the fluorescence of mcherry and EGFP, in this order from the leftmost fluorescence image. In the rightmost image of the fluorescence images of FIG. 3A, dots indicated in yellow represent the combining of mcherry and EGFP signals in the cells. In the rightmost image of the fluorescence images of FIG. 3A (a diagram in which EGFP+ mcherry signals were combined), the dots indicated in yellow were counted to calculate ratios of the dots to the whole cells, and then plotted on a bar graph. A scale bar represents 20 μm, and ***$P<0.001$ against the control.

As shown in FIG. 3A, it was observed that the aggregated α-synuclein remarkably decreased in the cells treated with efavirenz, compared with the control cells treated with DMSO. Also, it was observed that a distribution of α-synuclein remarkably decreased in the cells treated with efavirenz, compared with the control cells treated with DMSO (FIG. 3A). Therefore, it was confirmed that efavirenz hindered the cell-to-cell transmission of α-synuclein and the intracellular aggregation of α-synuclein.

Also, to test whether chlorhexidine, naphazoline, and tenofovir were involved in the process of moving the over-expressed monomeric A53T α-synuclein to adjacent cells to convert the over-expressed monomeric α-synuclein into aggregates, the cells were treated with either 10 μM chlorhexidine, 100 μM naphazoline, or 20 μM tenofovir, and then tested in the same manner as in the experiment for efavirenz. However, in the case of the naphazoline-administered group, the cells treated with PBS were used as the control, and the cells treated with DMSO were also used as the control in the case of the chlorhexidine- and tenofovir-administered groups. A scale bar represents 20 μm.

Figure 3B:
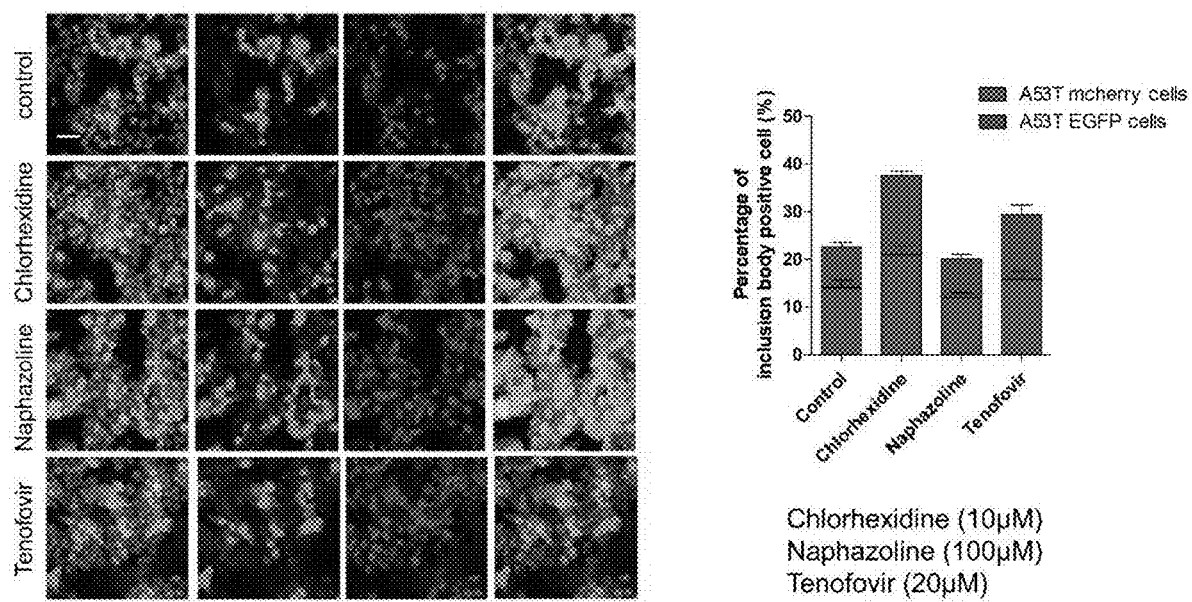

As shown in a fluorescence image of FIG. 3B, a distribution of α-synuclein and an amount of aggregated α-synuclein increased or were not significantly different in the cells treated with chlorhexidine, naphazoline, or tenofovir, compared with the control cells (FIG. 3B).

Therefore, it was confirmed that chlorhexidine, naphazoline, and tenofovir did not have a significant effect on reduction of the cell-to-cell transmission of α-synuclein and the intracellular aggregation of α-synuclein.

As a result, it can be seen that, because efavirenz is effective in reducing the cell-to-cell transmission of α-synuclein and inhibiting the intracellular aggregation of α-synuclein, it has a significant therapeutic effect on α-synuclein-related disorders (Parkinson's disease) by hindering the cell-to-cell transmission of α-synuclein and preventing the intracellular aggregation of α-synuclein. However, it can be seen that chlorhexidine, naphazoline, or tenofovir is not effective in treating Parkinson's disease because it did not have a significant effect in reducing the cell-to-cell transmission of α-synuclein and the intracellular aggregation of α-synuclein.

Example 3: Confirmation of In Vivo Effect of Efavirenz

3-1: Establishment of Laboratory Animal Model

In α-synuclein mutant mice, the transmission of aggregated α-synuclein occurs through injection of the aggregated α-synuclein. Therefore, to monitor an effect of efavirenz on the transmission of aggregated α-synuclein, a laboratory animal model in which aggregated α-synuclein was injected into an α-synuclein mutant mouse was established.

To prepare the aggregated α-synuclein, recombinant α-synuclein was over-expressed in an *Escherichia coli* BL21(DE3) strain, and the recombinant protein was purified using known methods (Lee, S. B., et al., 2009. Biochem Biophys Res Commun. 381, 39-43). The purified α-synuclein protein was stored at −80° C. before use as the monomeric α-synuclein. Five mg/mL of the monomeric α-synuclein was cultured for a week while continuous stirring at 37° C. and 1,000 rpm, lysed by brief sonication, and then stored at −80° C. before use as the monomeric α-synuclein.

Figure 4:
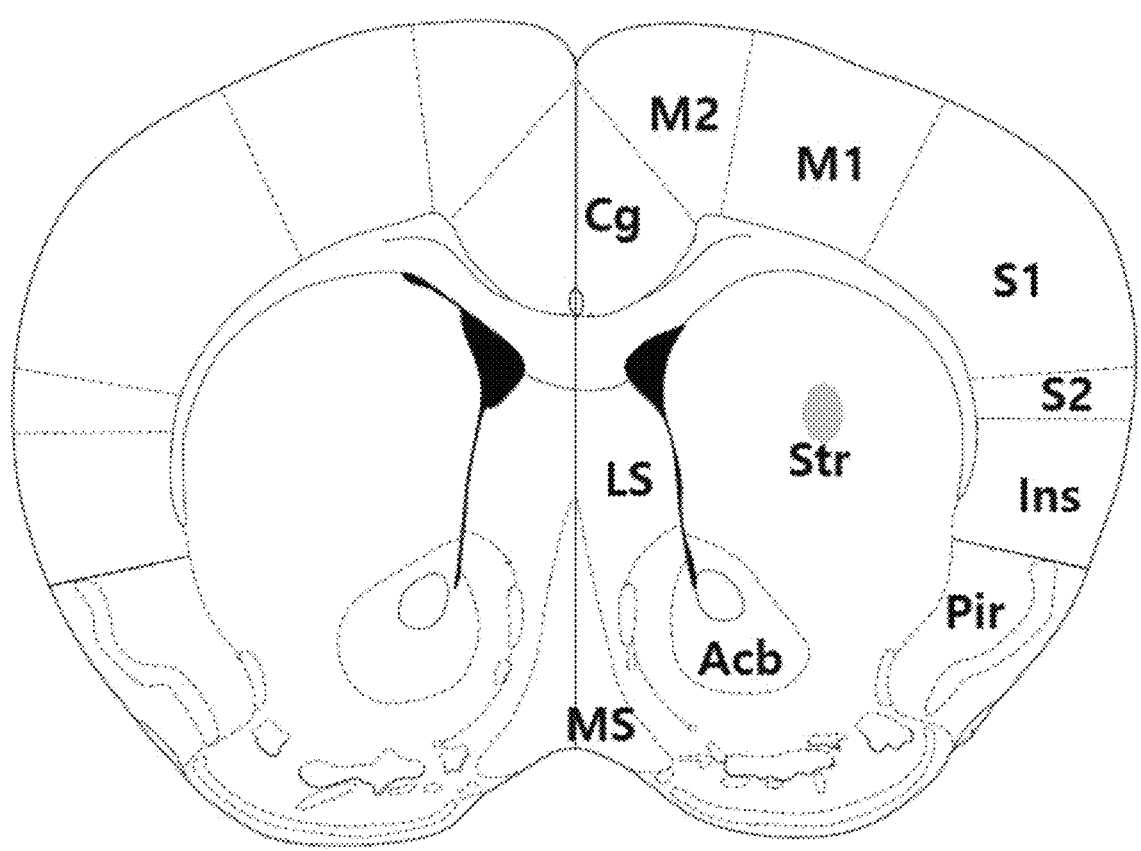
FIG. 4 shows injection sites of α-synuclein in an A53T-overexpressing mouse when a laboratory animal model is constructed to confirm an in vivo effect of efavirenz.

Mice between 8 and 12 weeks old (B6;C3-Tg(Prnp-SNCA*A53T)83V1e/J, M83; Jackson Laboratory) in which A53T, which is one of the mutations of α-synuclein expressed in humans, was over-expressed were used as the laboratory animal. Avertin was intraperitoneally administered to the mice at a dose of 200 μL per 20 g of body weight to anesthetize the mice. Thereafter, each of the mice was fixed in a stereotaxic frame, and the aggregated α-synuclein was injected into the striatum of each mouse at a dose of 10 μg with a Hamilton syringe, at the coordinates of 1.0 mm anterior (AP), 1.8 mm medial (ML), and 3.2 mm deep (DV) from the bregma of the mouse (FIG. 4), thereby establishing a laboratory animal model.

3-2: Confirmation of Inhibitory Effect of Efavirenz on Transmission of Aggregated α-Synuclein Using Immunohistochemical Staining To confirm an inhibitory effect of efavirenz on the transmission of aggregated α-synuclein, an immunohistochemical staining method, which targets pSer129 α-Syn, which is an α-synuclein variant used as a marker for Lewy bodies (α-synuclein aggregates) because a larger amount of the variant is included in the Lewy bodies (α-synuclein aggregates), was used.

Figure 5:
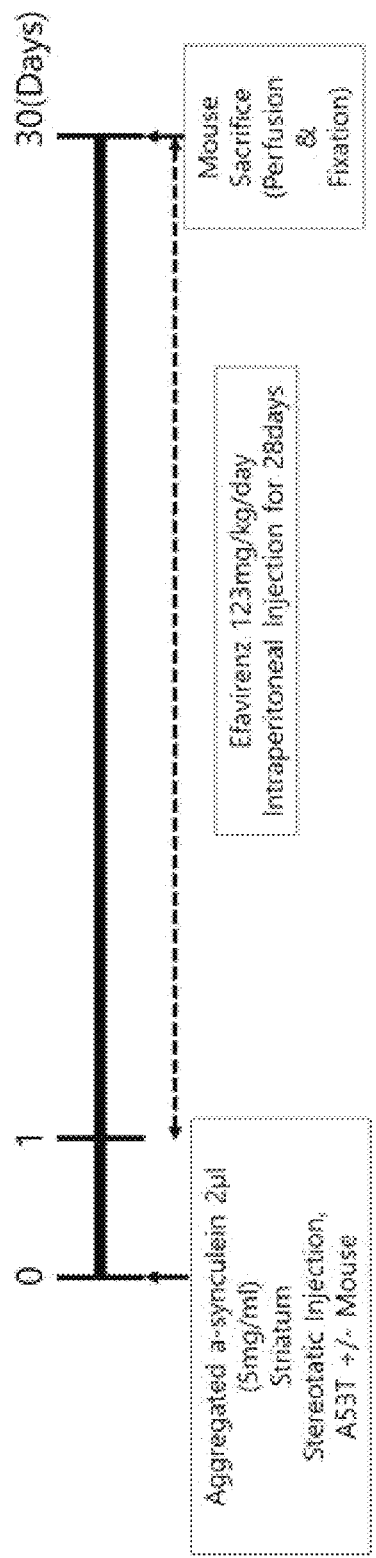
FIG. 5 is a schematic diagram of an in vivo experimental procedure for determining an inhibitory effect on the transmission of α-synuclein.

First, after the aggregated α-synuclein was injected into a laboratory animal model as described above, the mice were nursed for one day, and a PBS solution (PBS+0.5% hypromellose+0.1% Tween 80) or efavirenz was then intraperitoneally injected once a day at a dose of 123 mg/kg for a total of 4 weeks (FIG. 5). Next, the mice were anesthetized by administering urethane to the mice at a dose of 200 µL per 20 g of body weight. Thereafter, the chest was incised, and perfused by allowing a perfusate to flow through the left ventricle of the heart for 3 minutes. Then, the right atrium was incised to remove blood, and 4% paraformaldehyde was then allowed to flow through the right atrium for 3 minutes to fix a tissue. Subsequently, the brain was extracted, immersed in a 4% paraformaldehyde fixing solution for a day, and then subjected to a dehydration process until the debris settled at the bottom of a 30% sucrose solution. When it is confirmed that the debris settled at the bottom, the brain was then put on a fixing plate, and a compound was frozen at −20° C. using an O.C.T compound, frozen again at −80° C. for 30 minutes to obtain brain slices having a thickness of 35 µm. The brain slices were stored in a tissue storage solution.

For immunohistochemical staining, the brain slices were taken out of the tissue storage solution, washed three times with PBS for 10 minutes (hereinafter, the washing was unconditionally performed in triplicate after each brain slice was reacted in a certain solution). Thereafter, 3% hydrogen peroxide was added thereto, and reacted for 5 minutes to remove a peroxidase from the tissue. After the washing, a blocking solution (1% BSA, 0.2% Triton X-100) was added thereto, and blocked for an hour. Then, a pSyn #64 primary antibody (Wako #01525191) targeting the aggregated α-synuclein, and a secondary antibody were reacted at a concentration of 1:5,000 and 1:5,000, respectively, and the antibodies reacted with the tissue to be attached to the tissue were reacted with an ABC complex, and then subjected to a chromogenic reaction using 3,3'-diaminobenzidine. Subsequently, the tissue was attached to a microglass, dried, and then started to be dehydrated with 70% ethanol, followed by sequential dehydration with 80%, 90%, and 100% ethanol. Then, the tissue was reacted with xylene for about a day, taken out, and put on a glass, and a mounting solution was dropped on the tissue. Thereafter, the glass was covered with a cover glass, and the tissue was analyzed under 400× magnification using a dissecting microscope. A scale bar represents 50 µm. A laboratory animal model receiving the α-synuclein only was used as the control (indicated by 'Control' in FIG. 6) and compared with the experimental group in which the mice were injected with α-synuclein and then treated with efavirenz.

Figure 6:
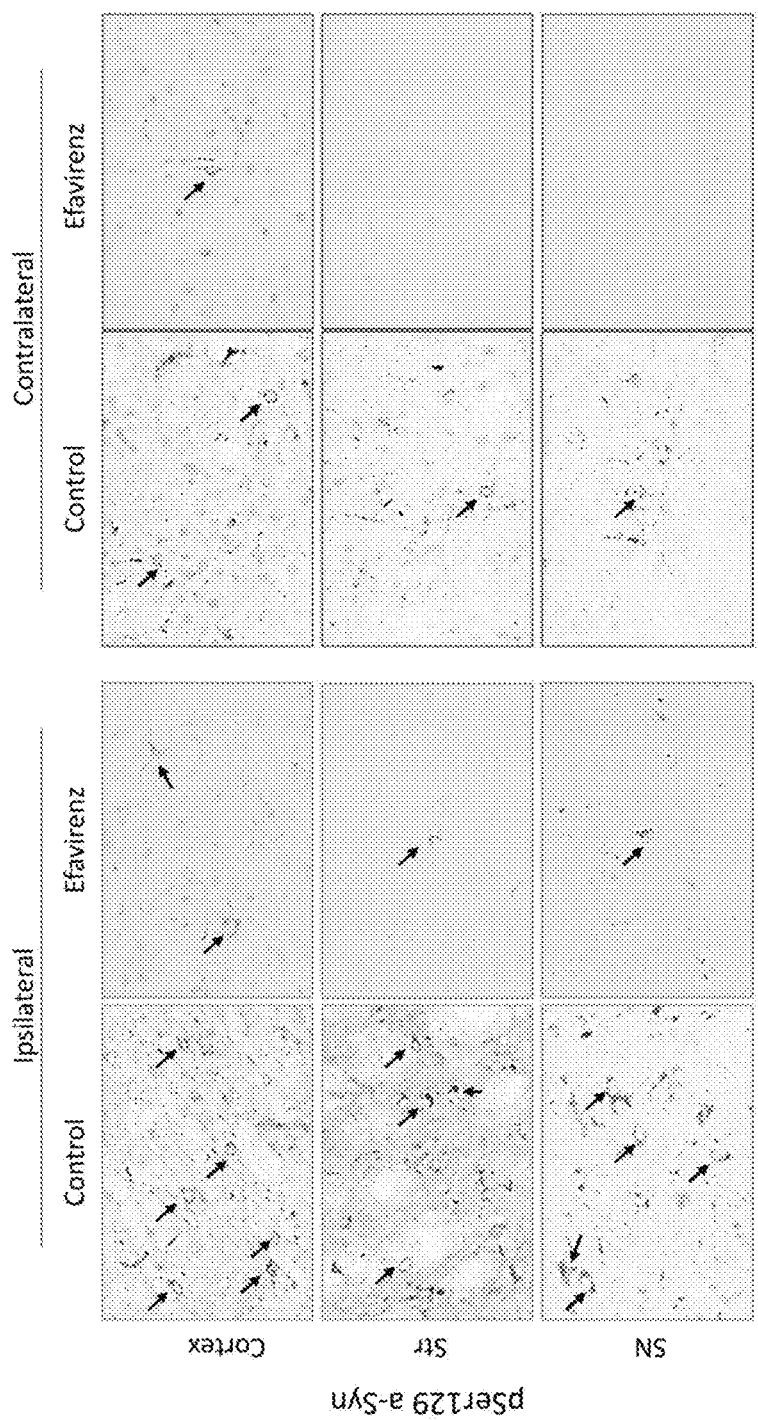
FIG. 6 shows the representative immunohistochemical staining images indicating a significant decrease of aggregated α-synuclein in a nerve tissue when efavirenz is administered to the nerve tissue.

To determine an effect of reducing the Lewy bodies, a level of the marker (pSer129 a-Syn) for Lewy bodies was investigated in the nerve tissue. As a result, it was observed that, when efavirenz was administered to the animal model, the aggregated α-synuclein present in the nerve tissues was remarkably lowered, compared with the control (FIG. 6).

Figure 7:
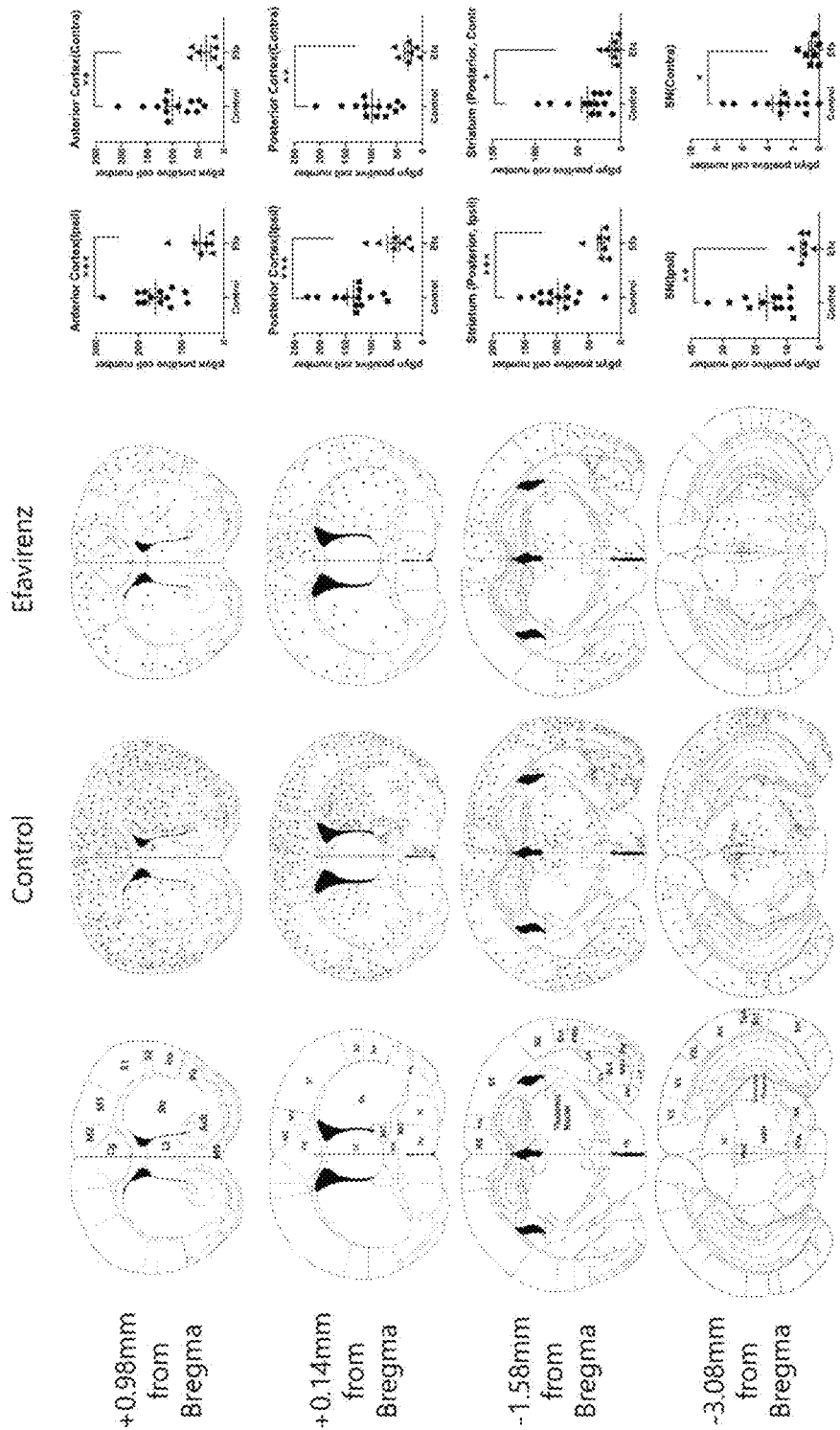
FIG. 7 is a diagram showing transmission of α-synuclein into areas of brain tissues in the control and an efavirenz-administered group. The abbreviations shown in FIG. 7 are defined as follows: an image of the anterior cingulate cortex (+0.98 mm from the bregma) is as shown in FIG. 4, and, in an image of the posterior cingulate cortex (+0.14 mm from the bregma), BST represents a bed nucleus of the striata terminalis, aca represents an anterior part of the anterior commissure, SI represents a substantia innominate, and Hy represents a hypothalamus. In an image of hippocampus (−1.58 mm from the bregma), RS represents a retrosplenial cortex, PtA represents a parietal association cortex, Ect represents an ectorhinal cortex, PRh represents a perirhinal cortex, Thalamic nuclei represent nuclei of the thalamus, LA represents a lateral amygdaloid nucleus, BLA represents an anterior part of the basolateral amygdaloid nucleus, BMA represents an anterior part of the basomedial amygdaloid nucleus, Ce represents a central amygdaloid nucleus, Me represents a medial amygdaloid nucleus, and Co represents a cortical amygdaloid nucleus. In an image of the midbrain (−3.08 mm from the bregma), V1 represents a primary visual cortex, V2 represents a secondary visual cortex, V2L represents a lateral area of the secondary visual cortex, Au represents an auditory cortex, TeA represents a temporal association cortex, Ent represents an entorhinal cortex, SC represents a superior colliculus, PAG represents a periaqueductal gray, MRN represents a reticular nucleus of the midbrain, Geniculate Thalamus represents a geniculate nucleus of the thalamus, VTA represents a ventral tegmental area, and SN represents a substantia nigra. Also, Ipsil refers to an ipsilateral side with respect to a site in which the aggregated α-synuclein is injected, and Contra refers to a contralateral side with respect to the site in which the aggregated α-synuclein is injected.

Also, the brain tissues were obtained from the group (Control) in which genetically modified mice between 8 and 12 weeks old, which had an α-synuclein mutation A53T, were injected with 10 µg of aggregated α-synuclein and intraperitoneally injected daily with 200 µL of a PBS solution (PBS+0.5% hypromellose+0.1% Tween 80) for 4 weeks, and the group in which the genetically modified mice were injected with 10 µg of aggregated α-synuclein and intraperitoneally injected daily with 123 mg/kg of efavirenz for 4 weeks. The brain tissues were obtained by incising the mouse's brain at the coordinates of 0.98 mm anterior, 0.14 mm anterior, 1.58 mm posterior, and 3.08 mm posterior from the mouse's bregma ("+0.98 mm from the bregma" "+0.14 mm from the bregma" "−1.58 mm from the bregma," and "−3.08 mm from the bregma", respectively, as shown in FIG. 7). The Lewy bodies (aggregated α-synuclein) in the tissues were stained by a DAB staining method to check whether the aggregated α-synuclein was transmitted into areas of each brain tissue. The number of the Lewy bodies positioned on the fine anatomical structures of each brain tissue was measured.

As a result, it was observed that the transmission of the Lewy bodies (aggregated α-synuclein) was remarkably lowered in the brain tissues from the animal model to which efavirenz was administered, compared with the control (FIG. 7). Also, the cells, in which the Lewy bodies were found in the areas of the brain tissues from the animal model to which efavirenz was administered, were counted, and compared with the control to directly compare the inhibitory effects of efavirenz on the transmission of aggregated α-synuclein. For the anterior cortex and the posterior cortex, the numbers of the cells in which Lewy bodies were found in a cingulate cortex (Cg), a primary motor cortex (M1), a secondary motor cortex (M2), a primary a somatosensory cortex (S1), a secondary somatosensory cortex (S2), an insular cortex (Ins), and a piriform cortex (Pir) were added up. When the results of administration of efavirenz were all compared with those of the control in a site to which aggregated α-synuclein was injected, an ipsilateral side (Ipsil), and a contralateral side (Contra), it was confirmed that efavirenz had an inhibitory effect on the transmission of aggregated α-synuclein ("Anterior Cortex (Ipsil)", "Anterior Cortex (Contra)", "Posterior Cortex (Ipsil)," and "Posterior Cortex (Contra)" as shown in FIG. 7). These results were identical in the striatum (Str) of the posterior cingulate cortex (+0.14 mm from the bregma) ("Striatum (Posterior, Ipsil)" and "Striatum (Posterior, Contra)" as shown in FIG. 7), and were also identical in the substantia nigra (SN) of the midbrain (−3.08 mm from the bregma) ("SN (Ipsil)" and "SN (Contra)" as shown in FIG. 7). *P<0.05, P<0.01, and *P<0.001 against the control. Each dot refers to one genetically modified mouse having an α-synuclein mutation A53T.

Accordingly, based on the results, it can be seen that efavirenz is effective in preventing and treating synucleinopathies, which include Parkinson's disease, because it has effects of hindering the cell-to-cell transmission of α-synuclein, preventing the intracellular aggregation of α-synuclein, and inhibiting the transmission of aggregated α-synuclein.

According to the present invention, based on the fact that efavirenz hinders the cell-to-cell transmission of α-synuclein, prevents the intracellular aggregation of α-synuclein, and inhibits the transmission of aggregated α-synuclein, there is provided a composition for preventing or treating synucleinopathies such as Parkinson's disease, dementia with Lewy bodies, and multiple system atrophy, which includes efavirenz or a salt or solvate thereof and a pharmaceutically acceptable carrier.

Although specific details of the present invention have been shown and described in detail, it should be apparent to those skilled in the art that such specific disclosure is merely preferred embodiments and is not intended to limit the scope of the present invention. Therefore, it should be understood that the scope of the present invention is defined in the appended claims and their equivalents.

The invention claimed is:
1. A method of curing, alleviating or reducing symptoms of synucleinopathies in a subject in need thereof, comprising administering an effective amount of efavirenz or a salt or solvate thereof to the subject.

2. The method of claim 1, wherein the synucleinopathies are selected from the group consisting of Parkinson's disease, dementia with Lewy bodies, and multiple system atrophy.

3. The method of claim 1, wherein the synucleinopathy is Parkinson's disease.

4. The method of claim 1, wherein the method exhibits hindrance of cell-to-cell transmission of alpha-synuclein, prevention of intracellular aggregation of alpha-synuclein, and/or inhibition of transmission of aggregated alpha-synuclein.

5. The method of claim 1, further comprising co-administering an effective amount of a dopamine precursor, a dopamine receptor agonist, a dopamine-metabolic enzyme inhibitor, or an anticholinergic agent.

6. The method of claim 5, wherein the dopamine precursor is levodopa or melevodopa.

7. The method of claim 1, wherein the administration is conducted orally, intravenously, intraarterially, intramuscularly, or intracutaneously.

8. The method of claim 7, wherein the administration is conducted orally.

9. The method of claim 5, wherein the dopamine receptor agonist is talipexole, piribedil, rotigotine, bromocriptine, pergolide, cabergoline, lisuride, pramipexole, ropinirole, or apomorphine.

10. The method of claim 5, wherein the dopamine-metabolic enzyme inhibitor is a monoamine oxidase inhibitor or a catechol-O-methyl transferase inhibitor.

* * * * *